(12) United States Patent
Koch et al.

(10) Patent No.: US 10,290,032 B2
(45) Date of Patent: May 14, 2019

(54) BLACKLISTING BASED ON IMAGE FEATURE ANALYSIS AND COLLABORATIVE FILTERING

(71) Applicant: Criteo SA, Paris (FR)

(72) Inventors: Olivier Koch, Paris (FR); Pierre-Emmanuel Mazaré, Paris (FR); Romain Lerallut, Paris (FR); Dan Teodosiu, Boulogne-Billancourt (FR)

(73) Assignee: Criteo SA, Paris (FR)

( * ) Notice: Subject to any disclaimer, the term of this patent is extended or adjusted under 35 U.S.C. 154(b) by 307 days.

(21) Appl. No.: 15/087,714

(22) Filed: Mar. 31, 2016

(65) Prior Publication Data

US 2017/0287023 A1    Oct. 5, 2017

(51) Int. Cl.
| | |
|---|---|
| *G06Q 30/00* | (2012.01) |
| *G06Q 30/06* | (2012.01) |
| *G06K 9/46* | (2006.01) |
| *G06K 9/62* | (2006.01) |
| *G06F 3/0482* | (2013.01) |

(52) U.S. Cl.
CPC ....... *G06Q 30/0601* (2013.01); *G06F 3/0482* (2013.01); *G06K 9/46* (2013.01); *G06K 9/6215* (2013.01); *G06K 9/6267* (2013.01)

(58) Field of Classification Search
CPC .................................................... G06Q 30/06
USPC ......................................................... 705/26.1
See application file for complete search history.

(56) References Cited

U.S. PATENT DOCUMENTS

| | | | |
|---|---|---|---|
| 9,898,812 B1* | 2/2018 | Padfield | G06T 7/0004 |
| 9,904,949 B1* | 2/2018 | Tavernier | G06Q 30/0631 |
| 2002/0138481 A1* | 9/2002 | Aggarwal | G06Q 30/02 |
| 2004/0133927 A1* | 7/2004 | Sternberg | G06F 17/30247 |
| | | | 725/136 |
| 2009/0240735 A1* | 9/2009 | Grandhi | G06Q 30/02 |
| 2011/0060437 A1* | 3/2011 | Durham | G06F 17/30265 |
| | | | 700/97 |
| 2011/0066497 A1* | 3/2011 | Gopinath | G06Q 30/02 |
| | | | 705/14.53 |
| 2011/0235902 A1* | 9/2011 | Chittar | G06F 17/3025 |
| | | | 382/162 |
| 2012/0290448 A1* | 11/2012 | England | G06Q 30/0282 |
| | | | 705/27.2 |
| 2016/0092959 A1* | 3/2016 | Gross | G06K 9/00671 |
| | | | 705/26.62 |

(Continued)

*Primary Examiner* — Mila Airapetian
(74) *Attorney, Agent, or Firm* — Proskauer Rose LLP

(57) ABSTRACT

Described are methods, systems, and apparatus for recommending catalog items for blacklisting. For each of a plurality of catalog items: image features are extracted; image features are associated with the catalog item; and user purchase events, user view events, a textual description, and categories are associated with the catalog item by the recommendation system. An identification of a first blacklisted catalog item is received. A catalog item is identified by the recommendation system based on i) a similarity between the image features associated with the first blacklisted catalog item and the image features associated with the catalog item, and ii) a correspondence between at least one of the user purchase events, the user view events, the textual description, or the categories associated with the blacklisted catalog item and the user purchase events, the user view events, the textual description, or the categories associated with the catalog item.

16 Claims, 6 Drawing Sheets

(56) References Cited

U.S. PATENT DOCUMENTS

| | | | |
|---|---|---|---|
| 2017/0011409 A1* | 1/2017 | Eager | G06Q 30/0201 |
| 2017/0193588 A1* | 7/2017 | Loui | G06Q 30/0631 |
| 2017/0228382 A1* | 8/2017 | Haviv | G06N 3/08 |
| 2017/0270593 A1* | 9/2017 | Sherman | G06K 9/00268 |
| 2018/0060935 A1* | 3/2018 | Dhua | G06K 9/6202 |

* cited by examiner

BLACKLISTING BASED ON IMAGE FEATURE ANALYSIS AND COLLABORATIVE FILTERING

FIELD OF THE TECHNOLOGY

The present technology relates generally to image feature analysis and collaborative filtering and, more specifically, to identifying catalog items for blacklisting based on image feature analysis and collaborative filtering.

BACKGROUND

Computerized ad systems can maintain catalogs of items for multiple merchants. Each catalog item can be one or more computerized records representing, for example, a product the merchant sells. Each catalog item can also be associated with one or more digital images of the product. A merchant may wish to blacklist catalog items that are, for example, illegal or violate the merchant's terms of service. Blacklisting catalog items can prevent those items from being displayed in online advertisements or on the merchant's webpages, in its applications, etc. However, as the size of the catalogs grow, it can be increasingly difficult for an advertiser to detect and identify items that should be blacklisted. As a result, catalog items that should be blacklisted can be inadvertently displayed.

SUMMARY OF THE TECHNOLOGY

Accordingly, there is a need for technology to facilitate computerized identification of catalog items that are candidates for blacklisting. The technology described herein can facilitate identification such catalog items by leveraging computerized analysis of digital image features and collaborative filtering. In one aspect, there is a computer-implemented method of recommending one or more catalogue items for blacklisting. The method can include for each catalog item of a plurality of catalog items: extracting, by the recommendation system, from at least one image associated with the catalog item, one or more catalog item image features; associating, by the recommendation system, with the catalog item, the one or more catalog item image features; and associating, by the recommendation system, with the catalog item, at least one of user purchase events for a plurality of users, user view events for a plurality of users, a textual description of the catalog item, and one or more categories for the catalog item. The method can include receiving, by the recommendation system, an identification of a first blacklisted catalog item, the first blacklisted catalog item being a catalog item of the plurality of catalog items. The method can include identifying, by the recommendation system, a first catalog item of the plurality of catalog items as a first candidate blacklisted catalog item based on i) a similarity between the one or more catalog item image features associated with the first blacklisted catalog item and the one or more image features associated with the first catalog item, and ii) a correspondence between at least one of the user purchase events, the user view events, the textual description, or the one or more categories associated with the blacklisted catalog item and at least one of the user purchase events, the user view events, the textual description, or the one or more categories associated with the first catalog item.

In some embodiments, the method includes generating, by the recommendation system, a user interface displaying the first catalog item as recommended for blacklisting. In some embodiments, the method includes receiving, by the recommendation system, user input indicating the first catalog item is blacklisted; and associating, by the recommendation system, with the first catalog item an indication the first catalog item is blacklisted. In some embodiments, the one or more catalog item image features are histograms of oriented gradients, color histograms, internal states of convolutional neural networks, or any combination thereof.

In some embodiments, the method includes identifying, by the recommendation system, a second catalog item of the plurality of catalog items as a second candidate blacklisted catalog item based on a correspondence between at least one of the user purchase events, the user view events, the textual description, or the one or more categories associated with the first blacklisted catalog item, and at least one of the user purchase events, the user view events, the textual description, or the one or more categories associated with the second catalog item.

In some embodiments, the method includes generating, by the recommendation system, a display of the first catalog item and second catalog item as recommended for blacklisting. In some embodiments, the display includes first indicia of i) the similarity between the one or more catalog item image features associated with the first blacklisted catalog item and the one or more image features associated with the first catalog item, and ii) the correspondence between the at least one of the user purchase events, the user view events, the textual description, or the one or more categories associated with the first blacklisted catalog item and the at least one of the user purchase events, the user view events, the textual description, or the one or more categories associated with the first catalog item; and second indicia of the correspondence between the at least one of the user purchase events, the user view events, the textual description, or the one or more categories associated with the first blacklisted catalog item, and the at least one of the user purchase events, the user view events, the textual description, or the one or more categories associated with the second catalog item.

In another aspect, there is a computer-implemented method of recommending one or more catalogue items for blacklisting. The method can include storing, by the recommendation system, a plurality of non-blacklisted catalog items, each catalog item of the plurality of non-blacklisted catalog items associated with one or more catalog item image features extracted from at least one image associated with the catalog item, and associated with at least one of user purchase events for a plurality of users, user view events for a plurality of users, a textual description of the catalog item, and one or more categories for the catalog item. The method can include storing, by the recommendation system, a plurality of blacklisted catalog items, each catalog item of the plurality of blacklisted catalog items associated with one or more catalog item image features extracted from at least one image associated with the catalog item, and associated with at least one of user purchase events for a plurality of users, user view events for a plurality of users, a textual description of the catalog item, and one or more categories for the catalog item. The method can include identifying, by the recommendation system, a plurality of candidate blacklisted catalog items from the plurality of non-blacklisted catalog items based on i) a similarity between the one or more catalog item image features associated with at least one of the plurality of blacklisted catalog items and the one or more image features associated with at least one of the plurality of candidate blacklisted catalog items, and ii) a correspondence between at least one of the user purchase events, the user view events, the textual description of the catalog item, or the one or more categories associated with the at least one of the plurality of blacklisted catalog items, and at least one of the user purchase events, the user view events, the textual description of the catalog item, or the one or more categories associated with the at least one of the plurality of candidate blacklisted catalog items.

In some embodiments, the method includes generating, by the recommendation system, a user interface displaying the plurality of candidate blacklisted catalog items as candidate blacklisted catalog items. In some embodiments, the method includes receiving, by the recommendation system, user input indicating a first candidate blacklisted catalog item is blacklisted; and associating, by the recommendation system, with the first candidate blacklisted catalog item an indication the first candidate blacklisted catalog item is blacklisted. In some embodiments, the one or more catalog item image features are histograms of oriented gradients, color histograms, or internal states of convolutional neural networks.

In some embodiments, the method includes identifying, by the recommendation system, a second plurality of candidate blacklisted catalog items from the plurality of non-blacklisted catalog items based on a correspondence between at least one of the user purchase events, the user view events, the textual description of the catalog item, or the one or more categories associated with a second at least one of the plurality of blacklisted catalog items, and at least one of the user purchase events, the user view events, the textual description of the catalog item, or the one or more categories associated with a second at least one of the plurality of candidate blacklisted catalog items.

In some embodiments, the method includes generating, by the recommendation system, a display of the plurality of candidate blacklisted catalog items and the second plurality of candidate blacklisted catalog items as candidate blacklisted catalog items. In some embodiments, the plurality of blacklisted catalog items are associated with a plurality of catalogs, and the plurality of candidate blacklisted catalog items from the plurality of non-blacklisted catalog items are associated with a first catalog of the plurality of catalogs.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In some embodiments, the technology described herein can facilitate identification of catalog items as candidates for blacklisting through application of computerized analysis of digital image features and collaborative filtering. As an exemplary application, the technology can include a blacklist recommendation system, such as a distributed computing system, for identifying catalog items in merchants' catalogs for blacklisting. The recommendation system can store a large number of catalog items (e.g., computerized records representing physical goods) from a variety of merchants. For each of the catalog items, the recommendation system can extract from an image for the catalog item catalog item image features and store the catalog item image features as associated with the catalog item. The recommendation system can also associate with the catalog item, for example, user purchase events (e.g., the users who have purchased the catalog item), user view events (e.g., the users that have viewed the catalog item on webpages or in applications), textual descriptions of the catalog item, and/or categories for the catalog item. Beneficially, the technology can leverage this information about the catalog items to prospectively identify catalog items that are candidates for blacklisting based on their similarity to already-blacklisted catalog items. Further, in some embodiments, the recommendation system can utilize information from multiple merchants' catalogs to identify blacklisting candidates within a particular merchant's catalog.

For example, the recommendation system can receive an identification of a blacklisted catalog item. The recommendation system can then identify other catalog items that are candidates for blacklisting based on the similarity between the catalog item image features associated with the blacklisted catalog item and catalog item image features associated with the other catalog items and a correspondence between the user purchase events, the user view events, the textual description, and/or the categories associated with the blacklisted catalog item and the user purchase events, the user view events, the textual description, and/or the categories associated with the other catalog items. Beneficially, the technology can utilize image analysis (e.g., the extracted image features) of the digital pictures associated with the catalog items as well collaborative filtering when identifying the candidates for blacklisting.

Exemplary System Architecture

Figure 1:
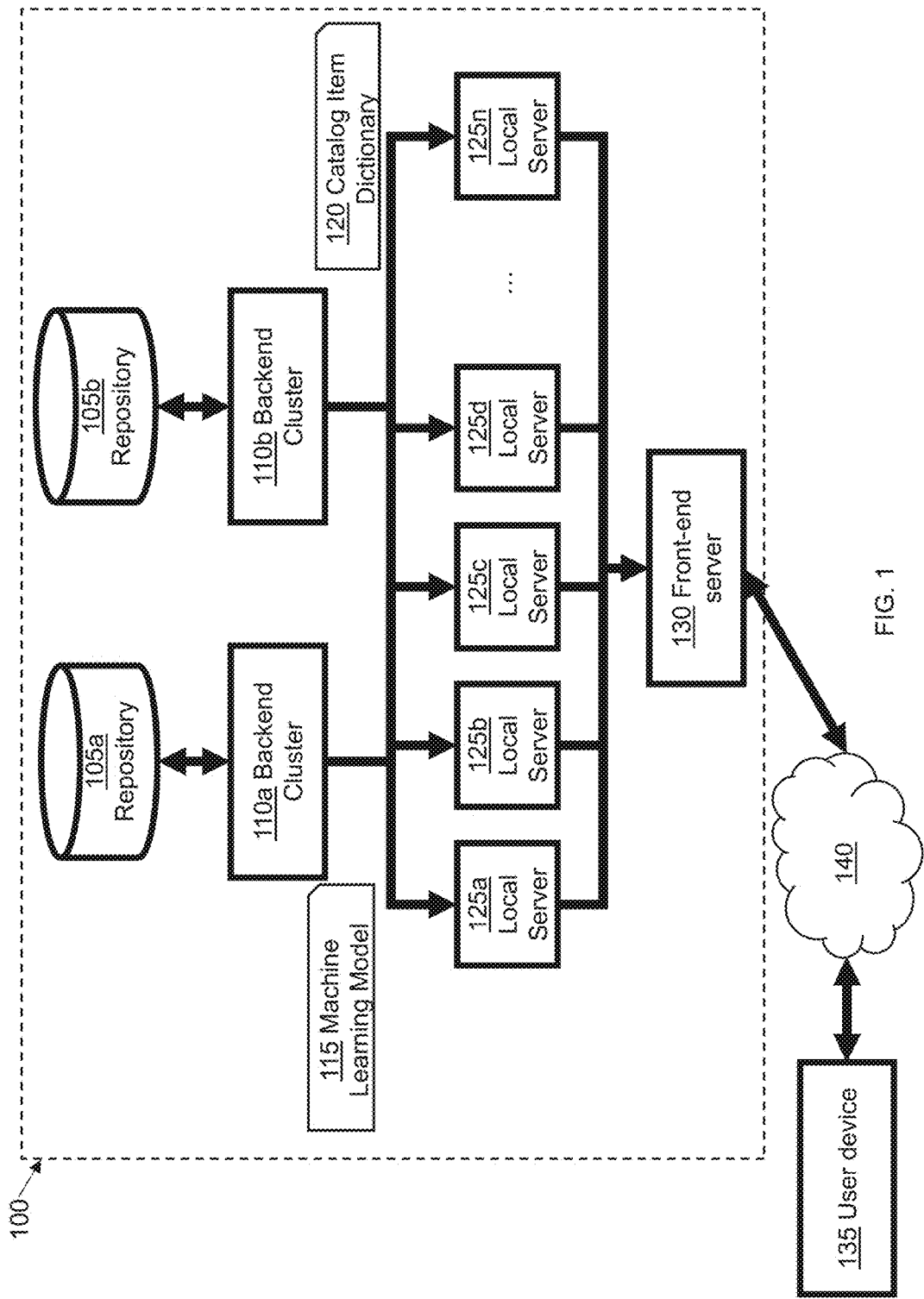
FIG. 1 illustrates an exemplary recommendation system in accordance with the technology.

FIG. 1 illustrates exemplary recommendation system 100 in accordance with the technology. Recommendation system 100 can include data repositories 105 and backend clusters 110. Data repositories 105 can store information about catalog items, such as digital images and/or extracted image features, user purchase events, user view events, textual descriptions, and/or categories associated with catalog items. In some embodiments, data repositories 105 can be Hadoop distributed file systems (HDFS). Data repositories 105 can be connected to backend clusters 110. Backend clusters 110 can be computing clusters, such as Hadoop clusters. As described in greater detail below with respect to FIGS. 2 and 3, backend clusters 110 can generate machine learning model 115 and catalog item dictionary 120 that recommendation system 100 can use to prospectively identify blacklist candidate catalog items.

Recommendation system 100 can include local servers 125. Backend clusters 105 can provide machine learning model 115 and catalog item dictionary 120 to local servers 125. For example, backend clusters 110 can periodically (e.g., hourly, daily, etc.) update machine learning model 115 and/or catalog item dictionary 120 based on new catalog data and/or user behavior data as it is collected. Backend clusters 110 can upload updated machine learning model 115 and/or catalog item dictionary 120 to local servers 125. Local servers 125 can store learning model 115 and catalog item dictionary 120 for later use by recommendation system 100 in identifying blacklist candidates. Recommendation system 100 can include front end server 130. Front end server can be a server through which user device 135 accesses recommendation system 100. For example, front-end server 125 can be a web server or application server connected to user device 135 by Internet 140. In operation, user device 135 (e.g., a computer or mobile computing device) accesses front-end server 130 to receive candidate blacklisted catalog items. Front-end server 130 can access one or more of local servers 125 to utilize the current machine learning model 115 and catalog item dictionary 120 to identify the candidate blacklisted catalog items.

Machine Learning Model and Catalog Item Dictionary Generation

Figure 2:
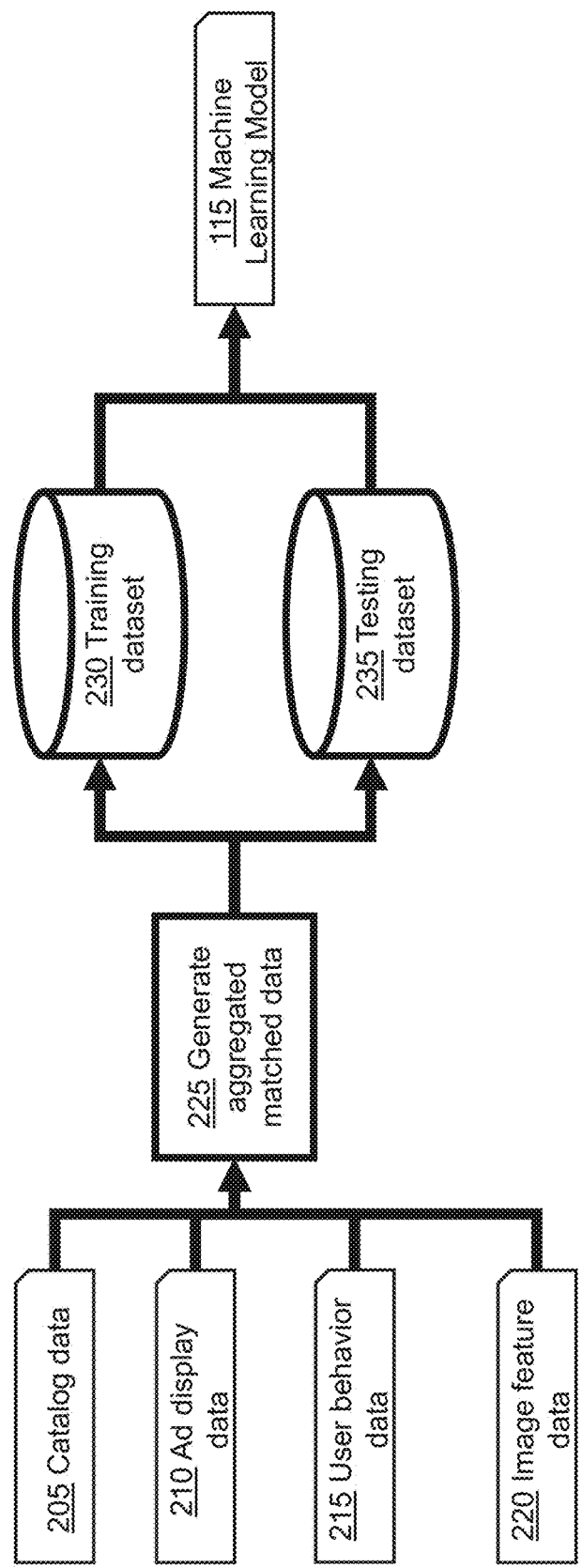
FIG. 2 illustrates generating a machine learning model.

FIG. 2 illustrates generating machine learning model 115. Machine learning model 115 can be used by recommendation system 100 to identify candidate blacklist candidate catalog items. For example, machine learning model 115 can be applied to a plurality of catalog items to determine a likelihood for each catalog item of the plurality of catalog items should be blacklisted. Referring to FIG. 2, the data used to generate machine learning model 115 can include catalog data 205, ad display data 210, user behavior data 215, and image feature data 220. Catalog data 205 can include information about catalog items, such as the textual description or categories associated with the catalog items. Ad display data 210 can include information about the display of catalog items in online advertisements, clicks, and conversions (e.g., when a displayed advertisement results in a user purchasing the catalog item). User behavior data 215 can include user purchase events (e.g., when a user purchases a catalog item) and, user view events (e.g., when a user views a catalog item online). Image feature data 220 can include image feature data extracted from digital images associated with catalog items. Image features can include histograms of oriented gradients, color histograms, or internal states of convolutional neural networks applied to the image. Catalog data 205, ad display data 210, user behavior data 215, and image feature data 220 can be retrieved from data repositories 105. In some embodiments, catalog data 205, ad display data 210, and user behavior data 215 can be collected by an advertising system that tracks online ad displays and user behavior. In some embodiments, image feature data 220 can be extracted by recommendation system 100.

At step 225, recommendation system 100 generates aggregated matched data based on catalog data 205, ad display data 210, user behavior data 215, and image feature data 220. For example, recommendation system 100 can join the data sources catalog data 205, ad display data 210, user behavior data 215, and image feature data 220 to associate the data across the data sources. Beneficially, this permits matching data across the data sources with click and purchase events. Recommendation system 100 can then separate the aggregated matched data into training data set 230 and testing data set 235. Recommendation system 100 can then apply regression techniques using methods such as the Broyden-Fletcher-Goldfarb-Shanno algorithm to training data set 230 to generate machine learning model 115. Machine learning model 115 can be trained to predict the similarity between catalog items. For example, machine learning model 115 can be trained to predict a likelihood that a non-blacklisted item should be blacklisted based on one or more identified blacklisted catalog items. Beneficially, by training machine learning model 115 on catalog data 205, ad display data 210, user behavior data 215, and image feature data 220, the model can utilize any of those kinds of data predictively. Further, by training machine learning model 115 on data relating to multiple merchant catalogs, a more robust and accurate model can be generated. As will be appreciated by those of skill in the art, recommendation system 100 can then test and verify machine learning model 115 using testing dataset 235.

In some embodiments, the process illustrated in FIG. 2 can be performed by backend clusters 110. In some embodiments, the process illustrated in FIG. 2 can be performed as an offline process with respect to providing candidate blacklisted catalog items. For example, the process need not be performed each time recommendation system 100 provides blacklist candidate catalog items.

Figure 3:
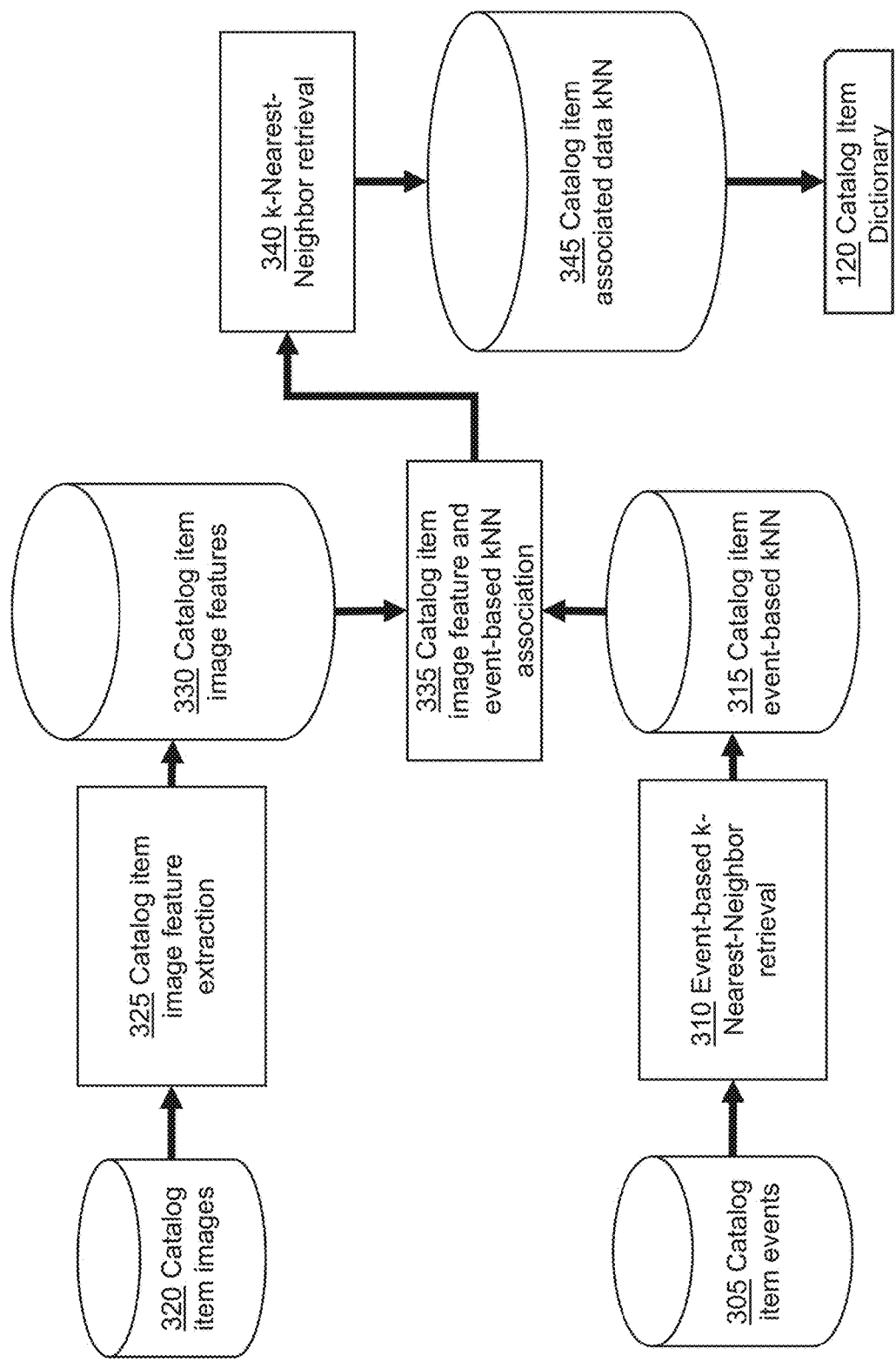
FIG. 3 illustrates generating a catalog item dictionary.

FIG. 3 illustrates generating catalog item dictionary 120. Catalog item dictionary 120 can provide, for a catalog item, a set of candidate catalog items most similar to the catalog item. Recommendation system 100 can utilize catalog item dictionary 120 to identify an initial set of candidate blacklisted catalog items quickly, in some embodiments, because catalog item dictionary 120 is computed offline with respect to the provision of candidate blacklisted catalog items. Recommendation system 100 can generate catalog item dictionary 120 utilizing a combination of collaborative filtering and image analysis. Referring to FIG. 3, recommendation system 110 can represent users by the set of catalog items with which they have interacted (e.g., viewed, purchased, etc.) to form catalog item events 305. At step 310, recommendation system 100 can determine the k-nearest neighbor catalog items for each catalog item (e.g., where k is 50-200 other catalog items). The resulting k-nearest neighbor catalog items can be associated with each catalog item and stored as catalog item event k-nearest neighbor data 315.

Still referring to FIG. 3, at step 325, recommendation system 100 can extract catalog item image features from digital images associated with catalog items. In some embodiments, the one or more catalog item image features are histograms of oriented gradients, color histograms, internal states of convolutional neural networks applied to the image, or any combination thereof. The resulting k-nearest neighbor catalog items can be associated with each catalog item and stored as catalog item image features data 330. At step 335, recommendation system 100 can associate catalog item event k-nearest neighbor data 315 and catalog item image features data 330, where catalog item event k-nearest neighbor data 315 for a catalog item is associated with catalog item image features data 330 for the same item. For example, catalog item image features data 330 can be embedded in catalog item event k-nearest neighbor data 315. At step 340, recommendation system 100 can determine the k-nearest neighbor catalog items for each catalog item (e.g., where k is 50-200 other catalog items) in the space of the associated catalog item event k-nearest neighbor data 315 and catalog item image features data 330. The resulting k-nearest neighbor catalog items can be associated with each catalog item and stored as catalog item associated data k-nearest neighbor data 345. Recommendation system 100 can then generate catalog item dictionary 120 based on catalog item associated data k-nearest neighbor data 345. It should be appreciated that other dictionaries can be generated using similar techniques. For example, a dictionary of most similar catalog items based on image feature data only can be generated, a dictionary of most similar catalog items based on catalog item category only can be generated, or, more generally, a dictionary of most similar catalog items based on any data related to catalog items can be generated.

In some embodiments, the process illustrated in FIG. 3 can be performed by backend clusters 110. In some embodiments, the process illustrated in FIG. 3 can be performed as an offline process with respect to providing blacklist candidates. For example, the process need not be performed each time recommendation system 100 provides blacklist candidates.

Realtime Blacklisting Candidate Identification

Figure 4:
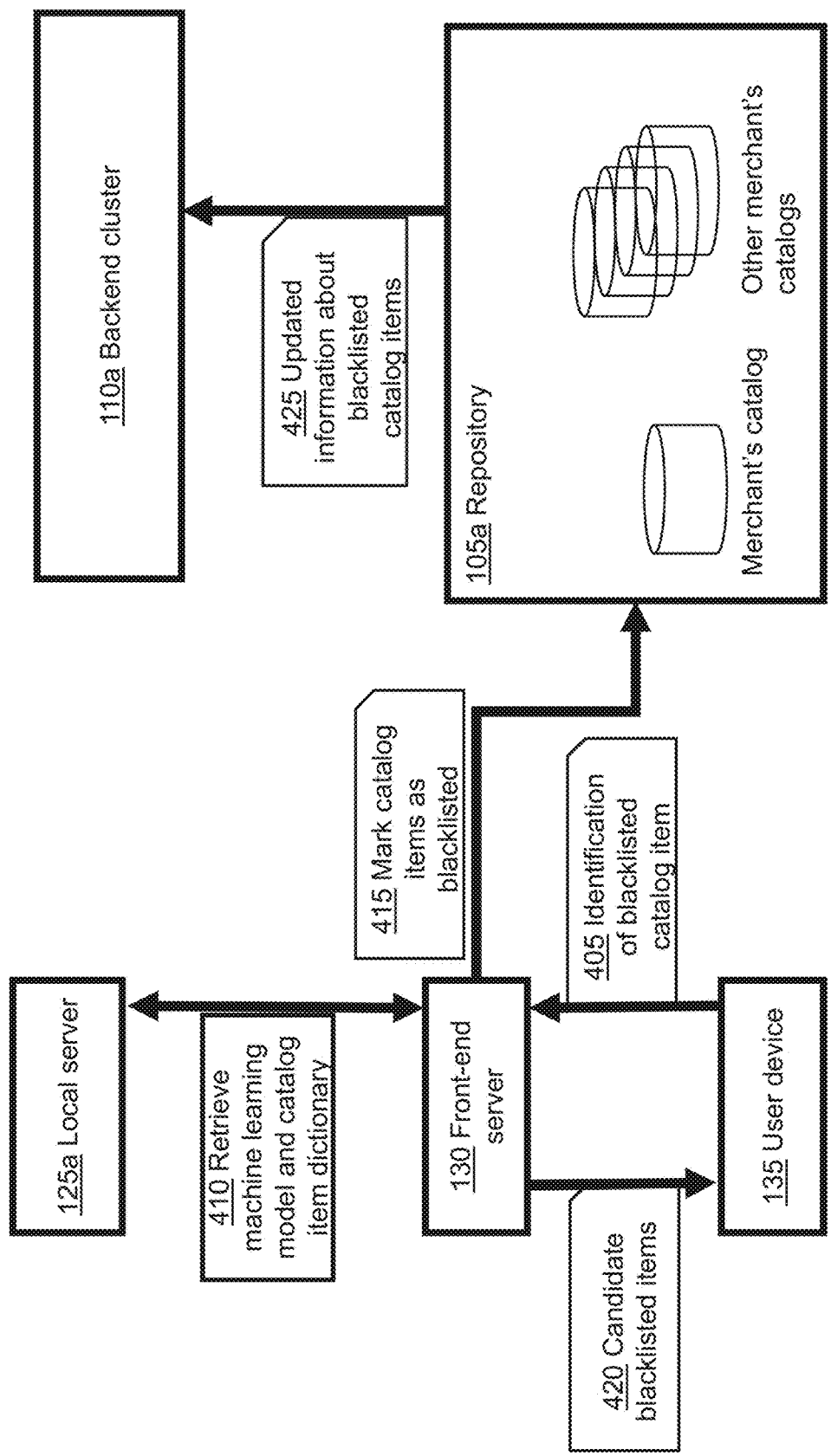
FIG. 4 is a flowchart illustrating a method of recommending catalogue items for blacklisting.
Figure 5:
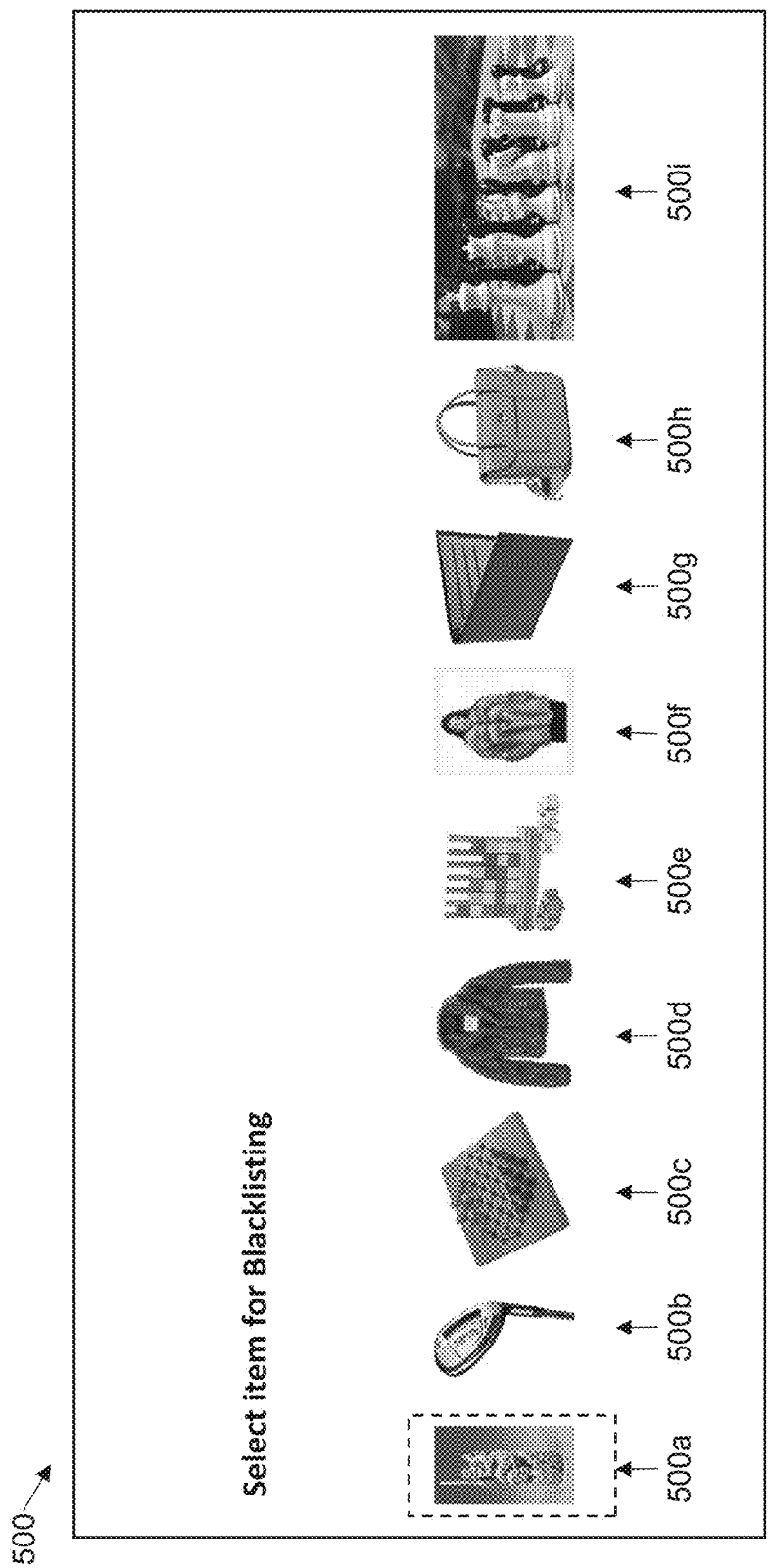
FIG. 5 depicts a user interface.
Figure 6:
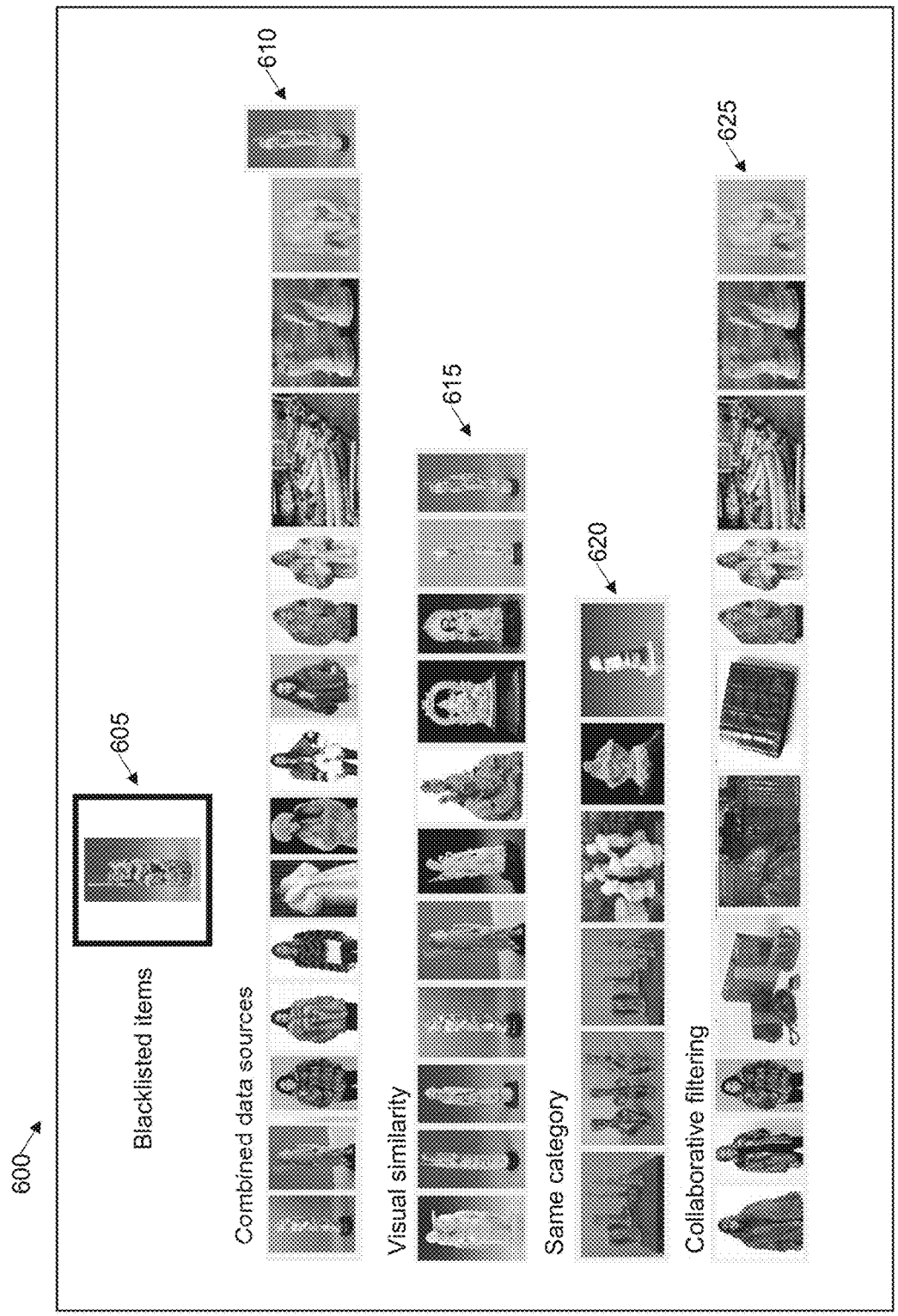
FIG. 6 depicts a user interface.

An application of the technology is illustrated with reference to FIGS. 4, 5, and 6. FIG. 4 is a flowchart illustrating a method of recommending catalogue items for blacklisting. FIG. 5 depicts user interface 500. FIG. 6 depicts user interface 600. With reference to FIG. 4, at step 405, user device 135 sends to front-end server 130 an identification of a blacklisted catalog item. For example, with reference to FIG. 5, user device 135 can display user interface 500 that includes catalog item images 510a-510i. User interface 500 can be, for example, a webpage served by front-end server 130. In some embodiments, a user can select one or more of catalog items images 510a-510i to indicate the catalog items are blacklisted. For example, a user can select catalog item image 500a for blacklisting. In response to the user's selection, user device 135 can send to front-end server 130 an identification of the catalog item associated with catalog item image 500a. At step 410, front-end server 130 can retrieve from local server 125a machine learning model 115 and catalog item dictionary 120. At step 415, front-end server 130 can update repository 105a by marking the selected catalog item as blacklisted.

At step 420, front-end server 130 can identify and send one or more candidate blacklisted catalog items to user device 135. For example, front-end server 130 can use catalog item dictionary 120 to identify an initial set of catalog items for candidate blacklisted catalog items (e.g., the candidate catalog items associated with the selected catalog item in catalog item dictionary 120). Front-end server 130 can reduce and/or refine the initial set of catalog items by applying machine learning model 115. As a result, front-end server 130 can identify the one more candidate blacklisted catalog items. In some embodiments, front-end server 130 selects the one more candidate blacklisted catalog items from a particular catalog of catalog items (e.g., the user's catalog). For example, with reference to FIG. 6, user device 135 can display user interface 600 that includes a catalog item image 605 that is associated with the identified blacklisted catalog item and images associated with candidate catalog items in rows 610, 615, 620, and 625. In the illustrated embodiment, row 610 includes images associated with candidate blacklisted catalog items that front-end server 130 identified using machine learning model 115 and catalog item dictionary 120. This identification can be based on image features and at least one of user purchase events, the user view events, the textual description, or the one or more categories associated with the blacklisted catalog item due to how machine learning model 115 and catalog item dictionary 120 are generated, as described above.

Row 615 includes images associated with candidate blacklisted catalog items that front-end server 130 identified based on image features associated with the blacklisted catalog item (e.g., using a catalog item dictionary based only on image features). Row 620 includes images associated with candidate blacklisted catalog items that front-end server 130 identified based on the one or more categories associated with the blacklisted catalog item (e.g., using a catalog item dictionary based only on item category). Row 625 includes images associated with candidate blacklisted catalog items that front-end server 130 identified based on collaborative filtering using user purchase events and user view events (e.g., using a catalog item dictionary based only on catalog item event data). In some embodiments, the user can select images in user interface 600 for blacklisting. In response to the user's selection, user device 135 can send to front-end server 130 identification of the catalog items associated with the selected catalog item images. It should be appreciated that the steps of flowchart 400 can be repeated as described above to generate additional candidate blacklisted items in response to the selected catalog items.

At step 425, backend cluster 110a can receive updated information about which catalog items have been blacklisted. Beneficially, this information can be incorporated into the processes for building machine learning model 115 and catalog item dictionary 120 described above to improve the accuracy of future recommendations.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computer-implemented method of recommending one or more catalog items for blacklisting, the method comprising:
   a. for each catalog item of a plurality of catalog items:
      i. extracting, by a recommendation system, from at least one image associated with the catalog item, one or more catalog item image features;
      ii. associating, by the recommendation system, with the catalog item, the one or more catalog item image features;
      iii. associating, by the recommendation system, with the catalog item, at least one of user purchase events for a plurality of users, user view events for a plurality of users, a textual description of the catalog item, and one or more categories for the catalog item; and
      iv. determining, by the recommendation system, one or more k-nearest neighbor catalog items of the plurality of catalog items based upon i) a similarity between the one or more catalog item image features associated with the catalog item and the one or more image features associated with one or more other catalog items, and ii) a correspondence between at least one of the user purchase events, the user view events, the textual description, or the one or more categories associated with the catalog item and at least one of the user purchase events, the user view events, the textual description, or the one or more categories associated with one or more other catalog items;
   b. receiving, by the recommendation system, an identification of a first blacklisted catalog item, the first blacklisted catalog item being a catalog item of the plurality of catalog items;
   c. identifying, by the recommendation system, first catalog item of the plurality of catalog items as a first candidate blacklisted catalog item when the first catalog item is in the one or more k-nearest neighbor catalog items of the blacklisted catalog item.

2. The method of claim 1, further comprising:
generating, by the recommendation system, a user interface displaying the first catalog item as recommended for blacklisting.

3. The method of claim 1, further comprising:
receiving, by the recommendation system, user input indicating the first catalog item is blacklisted; and
associating, by the recommendation system, with the first catalog item an indication the first catalog item is blacklisted.

4. The method of claim 1, wherein the one or more catalog item image features are internal states of convolutional neural networks applied to the at least one image.

5. The method of claim 1, further comprising:
identifying, by the recommendation system, a second catalog item of the plurality of catalog items as a second candidate blacklisted catalog item when the second catalog item is in the one or more k-nearest neighbor catalog items of the blacklisted catalog item.

6. The method of claim 5, further comprising:
generating, by the recommendation system, a display of the first catalog item and second catalog item as recommended for blacklisting.

7. The method of claim 6, wherein the display comprises first indicia of i) the similarity between the one or more catalog item image features associated with the first blacklisted catalog item and the one or more image features associated with the first catalog item, and ii) the correspondence between the at least one of the user purchase events, the user view events, the textual description, or the one or more categories associated with the first blacklisted catalog item and the at least one of the user purchase events, the user view events, the textual description, or the one or more categories associated with the first catalog item; and second indicia of the correspondence between the at least one of the user purchase events, the user view events, the textual description, or the one or more categories associated with the first blacklisted catalog item, and the at least one of the user purchase events, the user view events, the textual description, or the one or more categories associated with the second catalog item.

8. A computer-implemented method of recommending one or more catalog items for blacklisting, the method comprising:
   a. storing, by the recommendation system, a plurality of non-blacklisted catalog items, each catalog item of the plurality of non-blacklisted catalog items associated with one or more catalog item image features extracted from at least one image associated with the catalog item, and associated with at least one of user purchase events for a plurality of users, user view events for a plurality of users, a textual description of the catalog item, and one or more categories for the catalog item;
   b. storing, by the recommendation system, a plurality of blacklisted catalog items, each catalog item of the plurality of blacklisted catalog items associated with one or more catalog item image features extracted from at least one image associated with the catalog item, and associated with at least one of user purchase events for a plurality of users, user view events for a plurality of users, a textual description of the catalog item, and one or more categories for the catalog item;

c. determining, by the recommendation system, from the plurality of blacklisted catalog items, one or more k-nearest neighbor catalog items of the plurality of non-blacklisted catalog items based upon i) a similarity between the one or more catalog item image features associated with the catalog item and the one or more image features associated with one or more other catalog items, and ii) a correspondence between at least one of the user purchase events, the user view events, the textual description, or the one or more categories associated with the catalog item and at least one of the user purchase events, the user view events, the textual description, or the one or more categories associated with one or more other catalog items; and d. identifying, by the recommendation system, a plurality of candidate blacklisted catalog items from the plurality of non-blacklisted catalog items when a blacklisted catalog item is in the one or more k-nearest neighbor catalog items of the non-blacklisted catalog item.

9. The method of claim 8, further comprising:
generating, by the recommendation system, a user interface displaying the plurality of candidate blacklisted catalog items as candidate blacklisted catalog items.

10. The method of claim 8, further comprising:
receiving, by the recommendation system, user input indicating a first candidate blacklisted catalog item is blacklisted; and
associating, by the recommendation system, with the first candidate blacklisted catalog item an indication the first candidate blacklisted catalog item is blacklisted.

11. The method of claim 8, wherein the one or more catalog item image features are internal states of convolutional neural networks applied to the at least one image associated with the catalog item.

12. The method of claim 8, further comprising:
identifying, by the recommendation system, a second plurality of candidate blacklisted catalog items from the plurality of non-blacklisted catalog items when a second one of the plurality blacklisted catalog item is in the one or more k-nearest neighbor catalog items of a non-blacklisted catalog item.

13. The method of claim 12, further comprising:
generating, by the recommendation system, a display of the plurality of candidate blacklisted catalog items and the second plurality of candidate blacklisted catalog items as candidate blacklisted catalog items.

14. The method of claim 8, wherein the plurality of blacklisted catalog items are associated with a plurality of catalogs, and the plurality of candidate blacklisted catalog items from the plurality of non-blacklisted catalog items are associated with a first catalog of the plurality of catalogs.

15. The method of claim 1, wherein the one or more catalog item image features are (i) histograms of oriented gradients or (ii) color histograms, applied to the at least one image associated with the catalog item.

16. The method of claim 8, wherein the one or more catalog item image features are (i) histograms of oriented gradients or (ii) color histograms, applied to the at least one image associated with the catalog item.

\* \* \* \* \*